(12) United States Patent
Wiss et al.

(10) Patent No.: US 7,606,342 B1
(45) Date of Patent: Oct. 20, 2009

(54) TRACKING THE PHASE OF A RECEIVED SIGNAL

(75) Inventors: John Robert Wiss, Carlsbad, CA (US); Omer F. Acikel, San Diego, CA (US)

(73) Assignee: L-3 Communications Titan Corporation, San Diego, CA (US)

( * ) Notice: Subject to any disclaimer, the term of this patent is extended or adjusted under 35 U.S.C. 154(b) by 629 days.

(21) Appl. No.: 11/398,088

(22) Filed: Apr. 5, 2006

(51) Int. Cl.
*H04L 7/00* (2006.01)
*H04L 25/00* (2006.01)
*H04L 25/40* (2006.01)

(52) U.S. Cl. .................. 375/371; 375/354; 375/355; 375/362; 327/141; 327/144; 358/409; 713/400; 713/401; 714/12

(58) Field of Classification Search .................. None
See application file for complete search history.

(56) References Cited

U.S. PATENT DOCUMENTS

| | | | |
|---|---|---|---|
| 7,167,535 B2 * | 1/2007 | Sachse et al. | 375/375 |
| 7,274,758 B1 * | 9/2007 | Zhou et al. | 375/343 |
| 7,394,870 B2 * | 7/2008 | Chien et al. | 375/316 |
| 2005/0207519 A1 * | 9/2005 | Phang et al. | 375/354 |
| 2008/0165672 A1 * | 7/2008 | Ku et al. | 370/208 |

* cited by examiner

*Primary Examiner*—Shuwang Liu
*Assistant Examiner*—Gina McKie
(74) *Attorney, Agent, or Firm*—Edward W. Callan

(57) ABSTRACT

The tracking of the phase of a received signal having a known preamble is accomplished by the steps of: initializing a phase-locked loop in accordance with estimated phase parameters, which are generated during an estimation interval by processing samples of the known preamble; delaying the preamble; generating phase error parameters by processing samples of the delayed preamble; and training the phase locked loop by tracking the phase-tracked signal in accordance with the tracking error parameters during a training interval after the estimation interval. The timing of the sampling is likewise trained in a closed timing loop in accordance with timing error parameters generated during the training interval after the timing loop has been initialized by estimated timing parameters generated during the estimation interval. The duration of the delay of the preamble is one-half the duration of the estimation interval.

16 Claims, 4 Drawing Sheets

TRACKING THE PHASE OF A RECEIVED SIGNAL

BACKGROUND OF THE INVENTION

The present invention generally pertains to communication signal processing and is particularly directed to tracking a received signal having a known preamble followed by a message portion.

A prior art method of tracking the phase of a received signal packet having a known preamble followed by a message portion comprises the steps of:
  (a) generating a phase control signal in accordance with phase parameters;
  (b) tracking the phase of the received signal packet by mixing the received signal with the phase control signal to thereby provide a phase-tracked signal packet;
  (c) providing estimated phase and frequency parameters and estimated timing parameters by processing the known preamble;
  (d) causing said phase control signal to be generated in accordance with the estimated phase and frequency parameters;
  (e) generating a timing control signal in accordance with timing parameters;
  (f) providing samples of said phase-tracked signal packet by sampling said phase-tracked signal in accordance with the timing control signal;
  (g) causing the timing control signal to be generated in accordance with the estimated timing parameters;
  (h) generating phase error parameters and timing error parameters by processing samples of the phase-tracked signal packet;
  (i) causing the phase control signal to be adjusted in accordance with the phase error parameters generated by step (h); and
  (j) causing said timing control signal to be adjusted in accordance with the timing error parameters generated by step (h);

SUMMARY OF THE INVENTION

The present invention provides a method of tracking a received signal having a known preamble followed by a message portion, comprising the steps of:
  (a) tracking the received signal in accordance with tracking parameters to thereby provide a tracked signal;
  (b) providing estimated tracking parameters by processing said known preamble of the received signal during an estimation interval;
  (c) causing the received signal to be tracked in accordance with said estimated tracking parameters;
  (d) providing samples of said tracked signal by sampling said tracked signal;
  (e) delaying said preamble;
  (f) causing said samples to be provided during a training interval after said estimation interval by sampling the delayed preamble;
  (g) generating tracking error parameters during the training interval by processing said samples of the delayed preamble; and
  (h) causing said tracking of the received signal to be adjusted during the training interval in accordance with said tracking error parameters generated by step (g).

The tracking is initialized during said estimation interval and trained during said training interval.

In accordance with one aspect of the above-described method, the duration of said delay is one-half the duration of said estimation interval. This feature is further discussed in the latter part of the Detailed Description with reference to Equations 1-4.

The present invention also provides a method of tracking the phase of a received signal packet having a known preamble followed by a message portion, comprising the steps of:
  (a) generating a phase control signal in accordance with phase parameters;
  (b) tracking the phase of the received signal packet by mixing the received signal packet with said phase control signal to thereby provide a phase-tracked signal packet;
  (c) providing estimated phase and frequency parameters and estimated timing parameters by processing said known preamble during an estimation interval;
  (d) causing said phase control signal to be generated in accordance with said estimated phase and frequency parameters;
  (e) generating a timing control signal in accordance with timing parameters;
  (f) providing samples of said phase-tracked signal packet by sampling said phase-tracked signal packet in accordance with said timing control signal;
  (g) causing said timing control signal to be generated during said estimation interval in accordance with said estimated timing parameters;
  (h) delaying said preamble;

In accordance with another aspect of the present invention, the above-described method further comprises the steps of:
  (i) causing said samples to be provided after the training interval by sampling the message portion of the received signal;
  (j) generating tracking error parameters after the training interval by processing said samples of the message portion; and
  (k) causing said tracking of the received signal to be adjusted after the training interval in accordance with said tracking error parameters generated by step (j).
  (l) causing said timing control signal to be adjusted during the training interval in accordance with said timing error parameters generated by step (j).

In accordance with one aspect of the above-described method of tracking the phase of a received signal packet, the duration of the delay is one-half the duration of said estimation interval.

In accordance with another aspect of the above-described method of tracking the phase of a received signal packet, the method further comprises the steps of
  (m) causing said samples to be provided after the training interval by sampling the message portion of the received signal packet;
  (n) generating phase error parameters and timing error parameters after the training interval by processing said samples of the message portion;
  (o) causing the said phase control signal to be adjusted after the training interval in accordance with said phase error parameters generated by step (n); and
  (p) causing said timing control signal to be adjusted after the training interval in accordance with said timing error parameters generated by step (n).

The present invention additionally provides systems for performing the above-described methods and computer readable storage media containing instructions for accomplishing various steps of such methods.

Additional features of the present invention are described with reference to the detailed description of the preferred embodiments.

DETAILED DESCRIPTION

Figure 1:
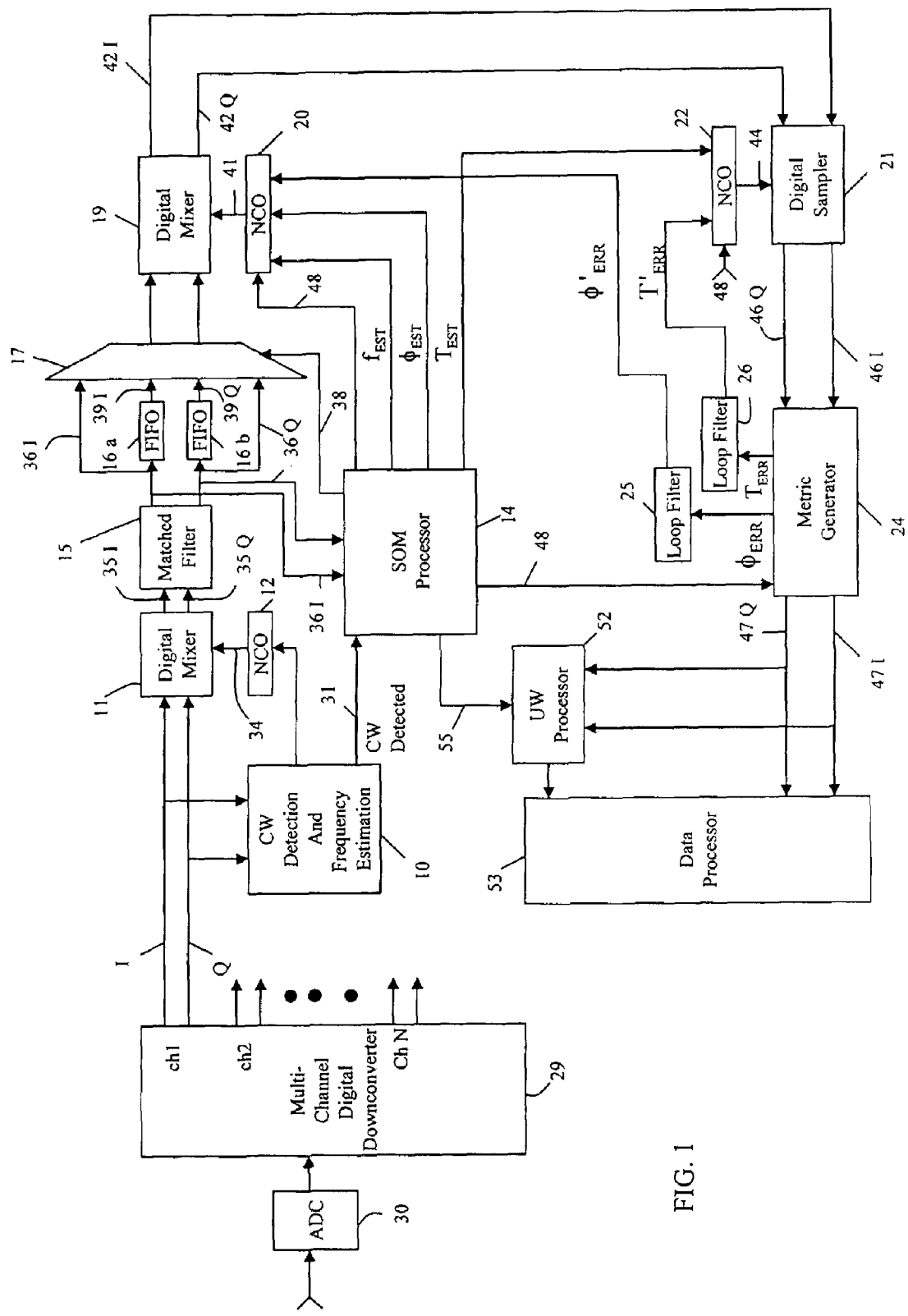
FIG. 1 is a block diagram of a preferred embodiment of a system for tracking the phase of a received signal in accordance with the method of the present invention.

Referring to FIG. 1, a preferred embodiment of a system for tracking the phase of a received signal packet in accordance with the method of the present invention includes a continuous wave (CW) detection and carrier frequency estimation unit 10, a first digital mixer 11, a first numerically controlled oscillator (NCO) 12, a start-of-message (SOM) processor 14, a matched filter 15, a pair of FIFO buffers 16a, 16b, a multiplexer 17, a second digital mixer 19, a second numerically controlled oscillator 20, a digital sampler 21, a third numerically controlled oscillator 22, a metric generator 24, a first loop filter 25 and a second loop filter 26.

A separate discrete received signal tracking system, as described above, is respectively connected to each output channel Ch1, Ch2, ... ChN of a multi-channel digital signal downconverter, 29, to which a multiplexed plurality of received signal packets having different carrier frequencies are provided from an analog-to-digital converter (ADC) 30. The downconverter 29 and the ADC 30 are not part of the system of the present invention.

Figure 2:
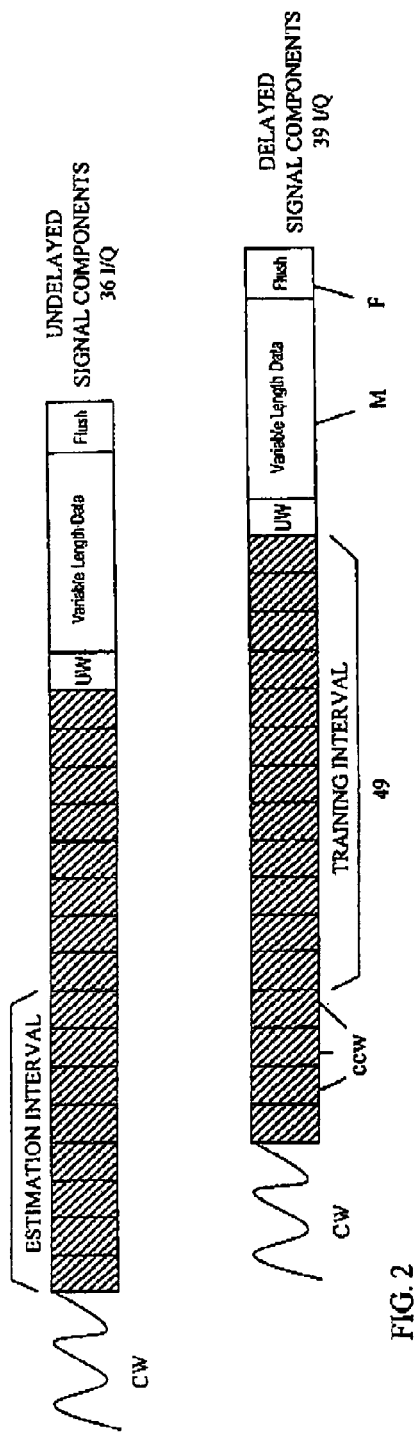
FIG. 2 is a diagram showing the structure of a received signal packet that is tracked by the system of FIG. 1, the delay of the signal packet, and the timing of the estimation interval and the training interval in relation to the undelayed and delayed signal packets respectively. The relative durations of the signal-packet components and of the estimation interval and the training interval shown in this diagram are not drawn to scale.

The system of FIG. 1 is adapted for tracking the phase of a received signal packet having a structure as shown in FIG. 2, wherein an unmodulated continuous wave (CW) pilot tone at a carrier frequency is followed by a preamble containing a plurality of repeated correlation code words (CCW). The repeated correlation code pattern is shown in context of a Multi-Frequency Time-Division Multiple Access (MF-TDMA) packet structure. By providing a plurality of repeated correlation code words, the signal to noise ratio of the preamble is increased. In alternative embodiments the packet structure may be other than the MF-TDMA structure.

In the received signal packet, the preamble is followed by a unique word (UW), a message portion (M) of variable length containing modulated data and a flush code (F). The unique word is used to determine the start of the message portion of the received signal packet. The data in the message portion includes coded data that either is in blocks or individually coded bits. The flush code causes the system of FIG. 1 to be reset to its initial state prior to the reception of the next signal packet.

In the preferred embodiment, the preamble, the unique word, and the message portion and the flush code are provided by modulating a continuous wave carrier signal in accordance with an OQPSK modulation scheme. In alternative embodiments, the modulation scheme is other than OQPSK.

The tracking system of FIG. 1 is adapted for tracking the phase of a received signal packet having a preamble that includes a predetermined number of correlation code words. Although sixteen correlation code words are shown in FIG. 2 such number of correlation code words is merely exemplary for the purpose of illustration. In the preferred embodiment, the correlation code is a Barker code and the preamble includes twenty-four Barker code words.

In alternative embodiments the correlation code is other than a Barker code and the system of FIG. 1 is adapted for tracking the phase of a received signal packet having a preamble that may include some other number of correlation code words.

The tracking system of FIG. 1 is adapted for tracking the phase of a received signal packet in a band of frequencies that includes the carrier frequency at which the received signal was transmitted.

The modulated signal has an in-phase component I and a quadrature component Q, which are respectively provided to the CW detection and carrier frequency estimation unit 10 and the first digital mixer 11 at a rate of a plural number of samples per symbol.

The CW detection and carrier frequency estimation unit 10 processes the I and Q components of the received signal to detect the un-modulated pilot tone CW and to make a coarse estimate $f_{COARSE}$ of the carrier frequency of the received signal. Upon detecting the received continuous wave pilot tone CW, the CW detection and carrier frequency estimation unit 10 provides a CW detection signal 31 to the SOM processor 14 and a signal 32 indicating the coarse estimate $f_{COARSE}$ of the carrier frequency to the first numerically controlled oscillator 12. The first numerically controlled oscillator 12 responds to the coarse estimate $f_{COARSE}$ of the carrier frequency by providing a signal 34 at the coarse estimate $f_{COARSE}$ of the carrier frequency to the first digital mixer 11.

The first digital mixer 11 mixes the I and Q components of the detected received signal with the signal 34 at the coarse estimate $f_{COARSE}$ of the carrier frequency in order to adjust the frequency of the detected signal in accordance with the coarse estimate $f_{COARSE}$ and thereby provide the detected signal components 35I, 35Q within a desired bandwidth.

The matched filter 15 filters the frequency-adjusted detected signal components 35I, 35Q and provides the filtered components 36I, 36Q to both the multiplexer 17 and the respective FIFO buffers 16a, 16b. In the preferred embodiment, the matched filter 15 is a low-pass signal-matched filter that is adapted for matching the shape of the signal that is being used for transmitting the signal that is being received, such as an RRC (root-raised cosine). In alternative embodiments, the filter 15 is merely a low-pass filter. In the preferred embodiment, the filter 15 operates at a minimum sample rate of PMOD samples per symbol. PMOD is the integer 2 or 4 of the respective modulated signal.

Preferably, each of the FIFO buffers 16a, 16b delays the respective filtered component 36I, 36Q by one-half the duration of the estimation interval 37 (FIG. 2).

During the estimation interval 37 the multiplexer 17 passes the undelayed components 36I, 36Q that are provided directly from the matched filter 15. Upon the conclusion of the estimation interval the multiplexer 17 then responds to a first switching signal 38 provided by the SOM processor 14 by passing the delayed signal components 39I, 39Q from the pair of FIFO buffers 16a, 16b.

The SOM processor 14 responds to the CW detection signal 31 by processing a portion of the known preamble of the respective undelayed signal components 36I, 36Q from the output of the matched filter 15 to provide an estimated phase parameter $\Phi_{EST}$, an estimated fine frequency parameter $f_{EST}$ and an estimated timing parameter $T_{EST}$.

During the estimation interval 37 the second numerically controlled oscillator 20 generates a phase control signal 41, which is initialized at the estimated phase of the undelayed signal components 36I, 36Q of the received signal in accordance with the estimated phase parameter $\Phi_{EST}$ and the estimated fine frequency parameter $f_{EST}$. The phase control signal 41 at the estimated phase of the received signal is provided to the second digital mixer 19.

After the estimation interval 37 the second digital mixer 19 tracks the phase of the respective delayed signal components 39I, 39Q passed by the multiplexer 17 by mixing the respective delayed components 39I, 39Q with the phase control signal 41 to thereby provide phase-tracked components 42I, 42Q.

During the estimation interval 37 the third numerically controlled oscillator 22 generates a timing control signal 44, which is initialized at an estimated sampling rate for the phase-tracked components 42I, 42Q of the received signal in accordance with the estimated timing parameter $T_{EST}$. The timing control signal 44 is provided to the digital sampler 21.

The digital sampler 21 samples the phase-tracked component samples 42I, 42Q at the rate of two samples per symbol in accordance with the timing control signal 44 to thereby provide component samples 46I, 46Q of the phase-tracked signal components 42I, 42Q. The digital sampler 21 is a Farrow sampler. In alternative embodiments, the digital sampler 21 is other than a Farrow sampler. The samples 46I, 46Q are provided at output of the digital sampler 21 at a fixed time offset (affecting the Mu value directly to shift the apparent time by a fixed amount).

The metric generator 24 processes the samples 46I, 46Q to generate a phase error parameters $\Phi_{ERR}$ and a timing error parameters $T_{ERR}$.

The phase error parameter $\Phi_{ERR}$ indicates any error in the phase of the phase-tracked component samples 46I, 46Q. The timing error parameter $T_{ERR}$ indicates any error in the timing of the sampling of the phase-tracked component samples 46I, 46Q.

Upon or shortly after the end of the estimation interval 37 the SOM processor 14 provides a second switching signal 48 that causes the training interval 49 to commence. The second switching signal 48 causes the second numerically controlled oscillator 20 to generate the phase control signal 41 in accordance with the phase error parameters $\Phi_{ERR}$ and also causes the third numerically controlled oscillator 22 to generate the timing control signal 44 in accordance with the timing error parameters $T_{ERR}$.

During the training interval 49, the metric generator 24 generates the phase error parameters $\Phi_{ERR}$ and the timing error parameters $T_{ERR}$ by processing the symbol sample components 46I, 46Q of the delayed preamble.

Filtered phase error parameters $\Phi'_{ERR}$ are provided via the first loop filter 25 to the second numerically controlled oscillator 20 to adjust the value of the phase control signal 41 by the amount of any error indicated by the filtered phase error parameter $\Phi'_{ERR}$ and thereby completes a phase-locked loop by means of which the tracking of the phase of the phase-tracked component samples 42I, 42Q by the second digital mixer 19 is adjusted in accordance with the filtered phase error parameter $\Phi'_{ERR}$.

Filtered timing error parameters $T'_{ERR}$ are provided via the second loop filter 26 to the third numerically controlled oscillator 22 in order to adjust the value of the timing control signal 44 by the amount of any error indicated by the filtered timing error parameter $T'_{ERR}$; and thereby completes a timing loop by means of which the timing of the sampling of the phase-tracked component samples 42I, 42Q by the digital sampler 21 is adjusted in accordance with the filtered timing error parameter $T'_{ERR}$.

Accordingly the above-described tracking system is initialized during the estimation interval 37 and trained during the training interval 49 for tracking the received signal packet until the message portion of the received signal packet commences.

FIG. 2 shows the timing of the delayed preamble, the estimation interval and the training interval in relation to the timing of the received signal packet. FIG. 2 is not drawn to scale. Note that the preamble is delayed for processing during the training interval 49 by one-half the duration of the estimation interval 37 and that the duration of the estimation interval 37 is approximately one-half the duration of the preamble. The delay of the preamble allows an unbiased estimate of the phase at the midpoint of the estimation interval and allows a second-look at the preamble data to allow for more training of the phase-lock loop and the timing loop. This makes the initial processing of the packet very robust and better prepares the loops for tracking the message portion of the received signal packet. This is advantageous in cases of high Doppler rate and low SNR.

Samples of the phase-tracked signal component samples 47I, 47Q are provided by the metric generator 24 at rate of one sample per symbol to a unique word detector 52 and to a data processor 53 that processes the message portion of the phase-tracked signal component samples 47I, 47Q.

Upon detecting the correlation code word sequence of the preamble, the SOM processor 14 provides a SOM detected signal 55 to enable the unique word detector 52. Upon detecting the unique word in the phase-tracked signal components 47I, 47Q, the enabled unique word detector 52 enables the data processor 53 to process the data contained in the message portion of the phase-tracked signal component samples 47I, 47Q. The unique word detector 52 and the data processor 53 are not part of the system of the present invention.

Figure 3:
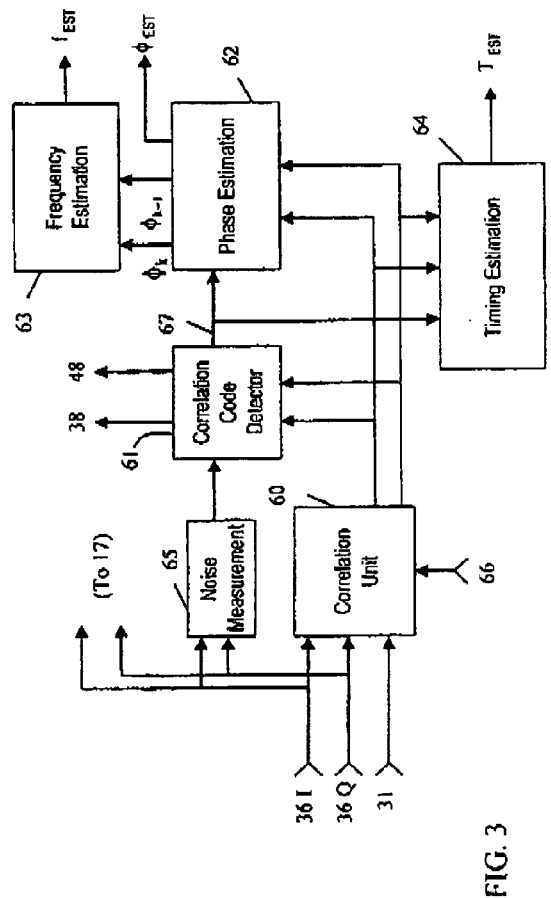
FIG. 3 is a block diagram of the portion of that the SOM processor included in the system of FIG. 1 that generates the estimated phase, frequency and the timing estimate parameters and provides switching signals to other components of the system.

Referring to FIG. 3, a preferred embodiment of the SOM processor 14 (FIG. 1) includes a correlation unit 60, a correlation code detector 61, a phase estimation unit 62, a frequency estimation unit 63, a timing estimation unit 64 and a noise measurement unit 65. The noise measurement unit 65 measures the noise in the preamble of the undelayed signal components 36I, 36Q.

When the SOM processor 14 receives the CW detected signal 31 provided by the CW detection and carrier frequency estimation unit 10, the correlation unit 60 correlates known correlation code sequences 66 with the correlation code sequences in the preambles of the undelayed signal components 36I, 36Q from the output of the matched filter 15. There are at least two different known correlation code sequences 66 that must be correlated since the preambles need to be distinct for a reference FOW (forward order wire) and other packet types. Correlation data is provided over a single correlation code word.

The correlation unit 60 provides the correlation data to the correlation code detector 61, the phase estimation unit 62 and the timing estimation unit 64.

The correlation code detector 61 processes the correlation data with the noise measurement provided by the noise measurement unit 65 and confirms detection of the correlation code in the preamble upon detecting the known correlation code sequence 61 in two successive correlation code words of the preamble. If such confirmation does not occur over a time period equal to the duration of the preamble then the CW detected signal 31 is determined to be false, whereupon the signal receiver reports the failure and awaits reception of another signal packet.

It is preferable that the duration of the estimation interval 37 is approximately one-half the duration of the preamble so that there is adequate time to provide the estimated phase parameter $\Phi_{EST}$ and the estimated timing error parameter $T_{EST}$ after the correlation code detector 61 has confirmed detection of the correlation code sequence in the preamble of the received signal packet.

After the correlation code is detected, the correlation code detector 61 provides a control signal 67 that causes the phase estimation unit 62 and the timing estimation unit 64 to generate the estimated phase parameter $\Phi_{EST}$ and the estimated timing parameter $T_{EST}$, respectively, by processing the correlation data provided by the correlation unit 60.

The estimated phase parameter $\Phi_{EST}$ and the timing parameter $T_{EST}$ are generated by averaging metrics of the amplitudes and phases of the correlation code words and the phase differences between successive code words.

The timing estimation unit 63 generates the estimated frequency parameter $f_{EST}$ by processing successive phase estimates $\Phi_K$ and $\Phi_{K-1}$ provided by the phase estimation unit 62.

The correlation code detector 61 performs an interpolation of averaged correlation data about the point where the correlation code sequence is detected to determine the optimum sampling instant for providing the estimated phase parameters $\Phi_{EST}$ and estimated frequency parameters $f_{EST}$ to the first numerically controlled oscillator 20 and for providing the estimated timing parameters $T_{EST}$ to the second numerically controlled oscillator 22 prior to the end of the estimation interval 37.

When the correlation code is detected, the correlation code detector 61 provides the first switching signal 38 to the multiplexer 17 and the second switching signal 48 to the metric generator 24, the first numerically controlled oscillator 20 and the second numerically controlled oscillator.

The first switching signal 38 is provided upon a count that begins upon the detection of the correlation code in the preamble and corresponds to the duration of at least two correlation code words in the preamble. The first switching signal 38 causes the multiplexer 17 to begin passing the delayed preamble from the FIFO buffers 16a, 16b.

The second switching signal 48 is provided upon a count that begins upon generation of the first switching signal 38 and corresponds to approximately one-half the duration of the preamble. The second switching signal 48 causes the metric generator 24 to begin generating the phase error parameters $\Phi_{ERR}$ and the timing error parameters $T_{ERR}$, causes the first numerically controlled oscillator 20 to begin adjusting the phase control signal 41 by the sign and value of the filtered phase error parameter $\Phi'_{ERR}$ and causes the second numerically controlled oscillator 22 to begin adjusting the timing control signal 44 by the sign and value of the filtered timing error parameter $T'_{ERR}$.

Figure 4:
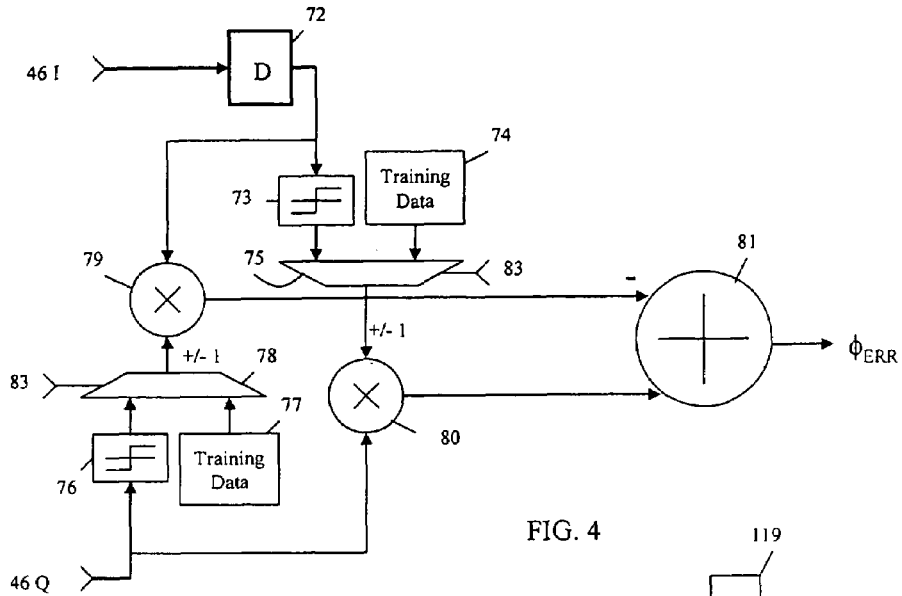
FIG. 4 is a block diagram of the portion of the metric generator included in the system of FIG. 1 that generates the phase error parameters.

Referring to FIG. 4, the portion of the metric generator 24 (FIG. 1) that generates the phase error parameters $\Phi_{ERR}$ includes an I-channel sample delay buffer 72, an I-channel raw data buffer 73, an I-channel training data buffer 74, an I-channel multiplexer 75, a Q-channel raw data buffer 76, a Q-channel training data buffer 77, a Q-channel multiplexer 78, a first multiplication unit 79, a second multiplication unit 80 and a summation unit 81.

The symbol sample components 46I, 46Q are received at a rate of two samples per symbol.

The sample delay buffer 72 delays the symbol sample component 46I by the duration of one sample.

The training data buffers 74, 77 each store training data in that is known to be in the preamble of the received signal packet. The training data represent the sign (+/−1) of the correlation code sequence values for the I and Q channels, which are appropriately synchronized by the SOM processor 14. The training data buffers 74, 77, are as deep as the number of correlation code symbols. The repetition of the identical data in the preamble portion allows the training data buffers 74, 77 to be accessed multiple times during reception of the preamble. This leaves approximately one-half the duration of the preamble for training the phase-lock loop and the timing loop. A training data buffer 74, 77 that can hold the +/−1 values of the correlation code data sequence for a single correlation code word is of sufficient size since the data sequence pattern is repeated and a circular buffer may be accessed several times to perform the training of the loops.

In alternative embodiments, the training data stored in the training data buffers 74, 77 may also represent the sign of the unique word data sequence values.

A signal (not shown) from the SOM processor 14 indicates which of the symbols of the stored correlation code data should be accessed from the training data buffers 74, 77 for the computation of the phase error parameters $\Phi_{ERR}$ during the training interval.

During the training interval 49, the I-channel multiplexer 75 provides the sign (+/−1) of the correlation code data accessed from the I-channel training data buffer 74 and the Q-channel multiplexer 78 provides the sign of the correlation code data accessed from the Q-channel training data buffer 77.

The first multiplication unit 79 multiplies the value of the one-sample-delayed sample component 46I from the output of the I-channel sample delay buffer 72 by the sign of the correlation code data accessed from the Q-channel training data buffer 77. The second multiplication unit 80 multiplies the value of the undelayed sample component 46Q by the sign of the correlation code data accessed from the I-channel training data buffer 74.

The summation unit 81 sums the negative of the signed value output of the first multiplication unit 79 with the signed value of the output of the second multiplication unit 80 to provide the phase error parameters $\Phi_{ERR}$ during the training interval.

After the training interval 49, the I-channel multiplexer 75 and the Q-channel multiplexer 78 respond to a third switching signal 83 by providing the sign of the raw data in the message portion of the respective symbol sample components 46I, 46Q.

The third switching signal 83 is generated within the metric generator 24 upon a count that begins upon receipt of the second switching signal 48 from the SOM processor 14 and corresponds to approximately seventy-five-percent of the duration of the preamble. In alternative embodiments, the third switching signal 83 may be generated upon a count that corresponds to some other percentage of the duration of the preamble.

The multiplexers 75, 78 provide the training data during the training interval 49. If the training interval 49 ends before the end of the correlation code portion of the delayed preamble, it is of no consequence. However, the duration of the training interval 49 should end and the loops should be locked before the multiplexers 75, 78 are switched in response to the switching signal 83 to provide the sign of the raw data from the raw data buffers 73,76, inasmuch as the raw data is subject to random noise and error.

The raw data in the I-channel raw data buffer 73 is one-sample-delayed data from the component 46I that is provided from the output of the I-channel sample delay buffer 72. The raw data in the Q-channel raw data buffer 76 is undelayed data from the component 46Q.

The first multiplication unit 79 multiplies the value of the one-sample-delayed sample component 46I from the output of the I-channel sample delay buffer 72 by the sign of the raw data accessed from the Q-channel raw data buffer 76. The second multiplication unit 80 multiplies the value of the undelayed sample component 46Q by the sign of the raw data accessed from the I-channel raw data buffer 73.

The summation unit 81 sums the negative of the signed value output of the first multiplication unit 79 with the signed value of the output of the second multiplication unit 80 to provide the phase error parameters $\Phi_{ERR}$ after the training interval.

A signal (not shown) from the SOM processor 14 identifies the peak samples (out of every predetermined number of samples) of sample components 46I, 46Q that are to be multiplied by the first and second multiplication units 79 and 80 both during and after the training interval.

The phase error parameters $\Phi_{ERR}$ are computed once for each symbol period.

Figure 5:
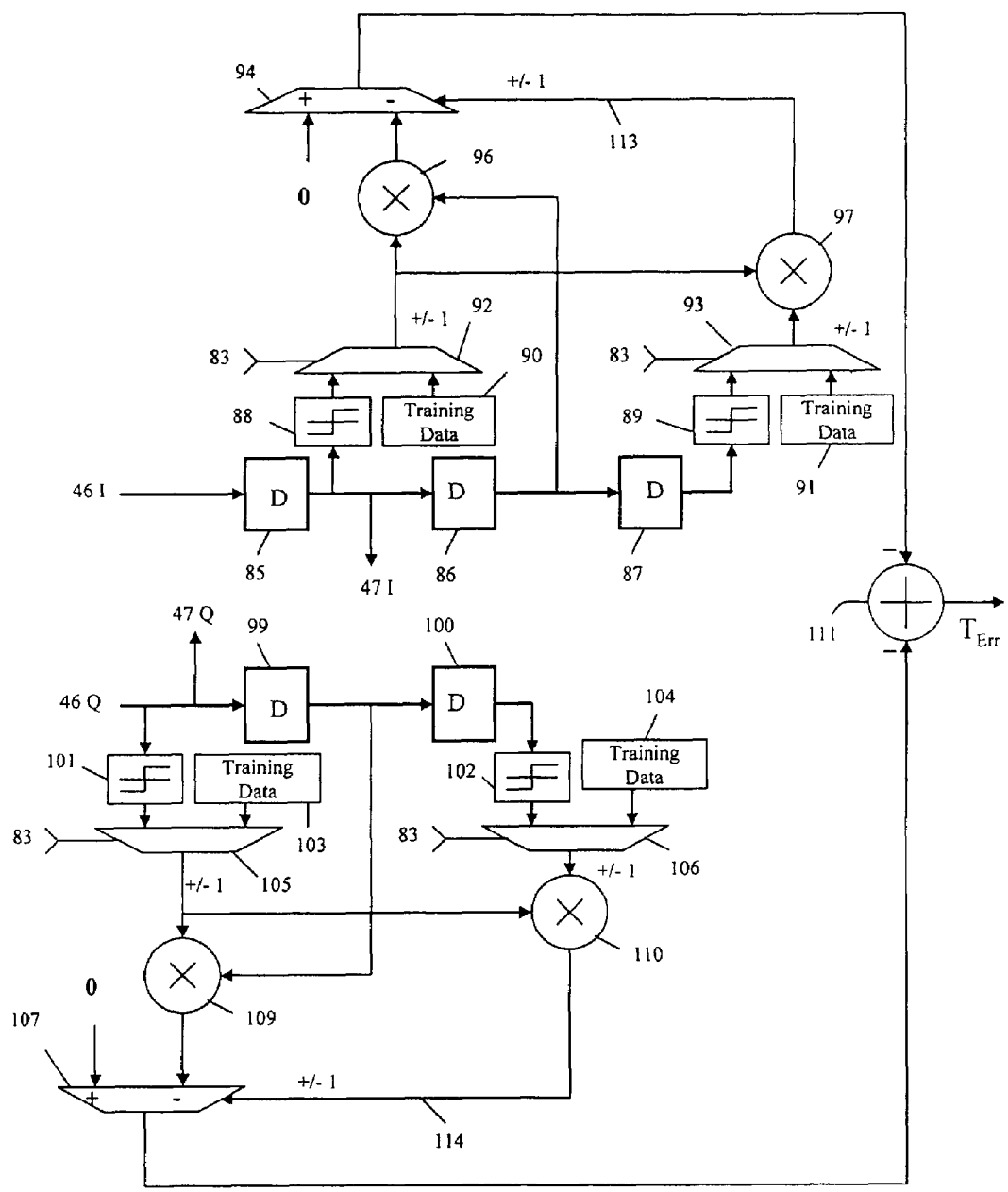
FIG. 5 is a block diagram of the portion of the metric generator included in the system of FIG. 1 that generates the timing error parameters.

Referring to FIG. 5, the portion of the metric generator 24 (FIG. 1) that generates the timing error parameters $T_{ERR}$ includes a first I-channel sample delay buffer 85, a second I-channel sample delay buffer 86, a third I-channel sample delay buffer 87, a first I-channel raw data buffer 88, a second I-channel raw data buffer 89, a first I-channel training data buffer 90, a second I-channel training data buffer 91, a first I-channel multiplexer 92, a second I-channel multiplexer 93, a third I-channel multiplexer 94, a first I-channel multiplication unit 96, a second I-channel multiplication unit 97, a first Q-channel sample delay buffer 99, a second Q-channel sample delay buffer 100, a first Q-channel raw data buffer 101, a second Q-channel raw data buffer 102, a first Q-channel training data buffer 103, a second Q-channel training data buffer 104, a first Q-channel multiplexer 105, a second Q-channel multiplexer 106, a third Q-channel multiplexer 107, a first Q-channel multiplication unit 109, a second Q-channel multiplication unit 110 and a summation unit 111.

The symbol sample components 46I, 46Q are received at a rate of two samples per symbol.

The I-channel sample delay buffers 85, 86, 87 and the Q-channel sample delay buffers 99, 100 each delay the respective symbol sample component 46I, 46Q by the duration of one sample.

The training data buffers 90, 91, 103, 104 each store the same training data as is stored in the training data buffers 74, 77, as described above.

A signal (not shown) from the SOM processor 14 indicates which of the symbols of the stored correlation code data should be accessed from the training data buffers 90, 91, 103, 104 for the computation of the timing error parameters $T_{ERR}$ during the training interval.

During the training interval 49, the first I-channel multiplexer 92 provides the sign (+/−1) of the correlation code data accessed from the first I-channel training data buffer 90, the second I-channel multiplexer 93 provides the sign of the correlation code data accessed from the second I-channel training data buffer 91, the first Q-channel multiplexer 105 provides the sign of the correlation code data accessed from the first Q-channel training data buffer 103 and the second Q-channel multiplexer 106 provides the sign of the correlation code data accessed from the Q-channel training data buffer 104.

The first I-channel first multiplication unit 96 multiplies the value of the two-sample-delayed sample component 46I from the output of the second I-channel sample delay buffer 86 by the sign of the correlation code data accessed from the first I-channel training data buffer 90. The second I-channel multiplication unit 97 multiplies the sign of the correlation code data accessed from the first I-channel training data buffer 90 by the sign of the correlation code data accessed from the second I-channel training data buffer 91.

A control signal 113 for the third I-channel multiplexer 94 is provided from the output of the second I-channel multiplication unit 97. When the sign of the control signal 113 is +1, the third I-channel multiplexer 94 provides a zero value to a first input of the summation unit 111. When the sign of the control signal 113 is −1, the third I-channel multiplexer 94 provides the signed value of the output from the first I-channel multiplication unit 96 to the first input of the summation unit 111.

The first Q-channel first multiplication unit 109 multiplies the one-sample-delayed sample component 46Q from the output of the first Q-channel sample delay buffer 99 by the sign of the correlation code data accessed from the first Q-channel training data buffer 103. The second Q-channel multiplication unit 110 multiplies the sign of the correlation code data accessed from the first Q-channel training data buffer 103 by the signal of the correlation code data accessed from the second Q-channel training data buffer 104.

A control signal 114 for the third Q-channel multiplexer 107 is provided from the output of the second Q-channel multiplication unit 110. When the sign of the control signal 114 is +1, the third Q-channel multiplexer 107 provides a zero value to a second input of the summation unit 111. When the sign of the control signal 114 is −1, the third Q-channel multiplexer 107 provides the signed value of the output from the first Q-channel multiplication unit 109 to the second input of the summation unit 111.

The summation unit 111 sums the negative of the signed value output of the third I-channel multiplexer 94 with the negative of the signed value of the third Q-channel multiplexer 107 to provide the timing error parameters $T_{ERR}$ during the training interval.

After the training interval 49, the first and second I-channel multiplexers 92, 93 and the first and second Q-channel multiplexers 105, 106 respond to the aforementioned third switching signal 83 by providing the sign of the raw data in the message portion of the respective symbol sample components 46I, 46Q.

The raw data in the first I-channel raw data buffer 88 is one-sample-delayed data from the component 46I that is provided from the output of the first I-channel sample buffer 85. The raw data in the second I-channel raw data buffer 89 is three-sample-delayed data from the component 46I that is provided from the output of the third I-channel sample delay buffer 87. The raw data in the first Q-channel raw data buffer 101 is undelayed data from the component 46Q. The raw data in the second Q-channel raw data buffer 102 is two-sample-delayed data from the component 46Q that is provided from the output of the second Q-channel sample delay buffer 100.

The first I-channel multiplexer 92 provides the sign (+/−) of the raw data accessed from the first I-channel raw data buffer 88, the second I-channel multiplexer 93 provides the sign of the raw data accessed from the second I-channel raw data buffer 89, the first Q-channel multiplexer 105 provides the sign of the raw data accessed from the first Q-channel raw data buffer 101 and the second Q-channel multiplexer 106 passes the sign of the raw data accessed from the second Q-channel raw data buffer 102.

The first I-channel first multiplication unit 96 multiplies the value of the two-sample-delayed sample component 46I from the output of the second I-channel sample delay buffer 86 by the sign of the raw data accessed from the first I-channel raw data buffer 88. The second I-channel first multiplication unit 97 multiplies the sign of the raw data accessed from the first I-channel raw data buffer 88 by the sign of the raw data accessed from the second I-channel raw data buffer 89.

A control signal 113 for the third I-channel multiplexer 94 is provided from the output of the second I-channel multiplication unit 97. When the sign of the control signal 113 is +1, the third I-channel multiplexer 94 provides a zero value to a first input of the summation unit 111. When the sign of the control signal 113 is −1, the third I-channel multiplexer 94 provides the signed value of the output from the first I-channel multiplication unit 96 to the first input of the summation unit 111.

The first Q-channel first multiplication unit 109 multiplies the one-sample-delayed sample component 46Q from the output of the first Q-channel sample delay buffer 99 by the sign of the sign of the raw data accessed from the first Q-channel raw data buffer 101. The second Q-channel multiplication unit 110 multiplies the sign of the sign of the raw data accessed from the first Q-channel raw data buffer 101 by the sign of the sign of the raw data accessed from the second Q-channel raw data buffer 102.

A control signal 114 for the third Q-channel multiplexer 107 is provided from the output of the second Q-channel multiplication unit 110. When the sign of the control signal 114 is +1, the third Q-channel multiplexer 107 provides a zero value to a second input of the summation unit 111. When the sign of the control signal 114 is −1, the third Q-channel multiplexer 107 provides the signed value of the output from the first Q-channel multiplication unit 109 to the second input of the summation unit 111.

The summation unit 111 sums the negative of the signed value output of the third I-channel multiplexer 94 with the negative of the signed value of the third Q-channel multiplexer 107 to provide the timing error parameters $T_{ERR}$ after the training interval.

The timing error parameters $T_{ERR}$ are computed once for each symbol period.

One-sample-delayed I-channel phase-tracked signal component samples 47I are provided from the output of the first I-channel sample delay buffer 85. The delayed I-channel samples 47I and undelayed samples of the Q-channel phase-tracked signal component samples 47Q are provided to the unique word detector 52 and to the data processor 53. The phase-tracked signal component samples 47I, 47Q are provided at the rate of one sample per symbol.

Figure 6:
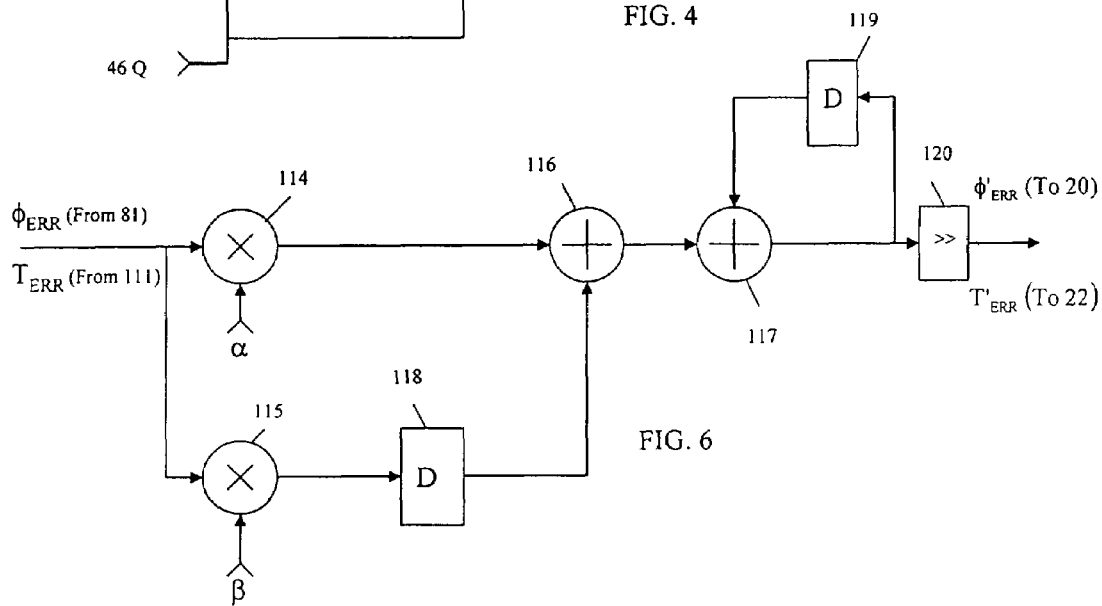
FIG. 6 is a block diagram of the loop filters included in the system of FIG. 1.

Referring to FIG. 6, each of the two loop filters 25, 26 (FIG. 1) includes a first multiplication unit 114, a second multiplication unit 115, a first summation unit 116, a second summation unit 117, a first delay buffer 118, a second delay buffer 119 and a right-shift unit 120. In alternative embodiments the loop filters 25, 26 may have a different architecture.

The phase error parameter $\Phi_{ERR}$ is provided to the input of the loop filter 25. The timing error parameter $T_{ERR}$ is provided to the input of the loop filter 26.

The first multiplication unit multiplies the particular error parameter $\Phi_{ERR}$ or $T_{ERR}$ provided to the input of the respective loop filter 25 or 26 by a first coefficient $\alpha$ and the second multiplication unit multiplies the particular error parameter by a second coefficient value $\beta$. During the training interval 49, the nominal decimal values of $\alpha$ and $\beta$ are 956 and −942 respectively for the loop filter 25 that filters the phase error parameter $\Phi_{ERR}$ and 3418 and −3413 respectively for the loop filter 26 that filters the timing error parameter $T_{ERR}$. After the training interval 49, the nominal decimal values of $\alpha$ and $\beta$ are 1080 and −1065 respectively for the loop filter 25 that filters the phase error parameter $\Phi_{ERR}$ and 2563 and −2561 respectively for the loop filter 26 that filters the timing error parameter $T_{ERR}$. The signals provided at the outputs of the first and second multiplication units 114, 115 are not truncated.

No truncation is allowed in the loop filters 25, 25 and all natural bit growth must be preserved in order to ensure that there is no limit cycling or other nonlinear effects due to excessive quantization. Whenever a small loop gain and/or loop bandwidth is needed all truncation should be avoided in both the phase-locked loop and the timing loop.

The coefficient values $\alpha$ and $\beta$ are changed from the during-training-interval values to the after-training-interval values in response to signals (not shown) received from the metric generator 24, when the third switching signal 83 is provided to the multiplexers 75, 78 of the portion of the metric generator shown in FIG. 4 and to the multiplexers 92, 93, 105, 106 of the portion of the metric generator shown in FIG. 5. Such change narrows the bandwidths of the phase-locked loop and the timing loop and may modify the damping ratio of the loops.

The first delay buffer 118 delays the signal provided from the output of the second multiplication unit 115 by the duration of one sample.

The first summation unit 116 sums the value of the output of the first multiplication unit 114 with the value of the one-sample-delayed output of the second multiplication unit 115.

The second delay buffer 119 delays the signal provided from the output of the second summation unit 117 by the duration of one sample.

The second summation unit 117 sums the value of the output of the first summation unit 116 with the value of the one-sample-delayed output of the second summation unit 117.

The right-shift unit 120 shifts the signal provided from the output of the second summation unit 117 by three spaces in the preferred embodiment. In alternative embodiments, the right shift provided by the right-shift unit 120 may be other than three spaces.

The particular filtered error parameter $\Phi'_{ERR}$ or $T'_{ERR}$ is provided from output of the right shift unit 120 to the numerically controlled oscillator 20, 22 (FIG. 1) to which the loop filter 25, 26 is respectively connected. The actual number of bits of the particular filtered error parameter $\Phi'_{ERR}$ or $T'_{ERR}$ provided at the respective outputs of the loop filters 25, 26 may be different.

In alternative embodiments, the loop filter coefficients $\alpha$ and $\beta$ may have other values than those stated above. The loop filter coefficients $\alpha$ and $\beta$ are selected to allow flexibility for controlling the dynamics of the loops and for retaining extra precision beyond what is essential for good tracking performance of the loop. Variation of the loop filter coefficients α and β allows different loop bandwidths and damping ratios to be provided at different symbol rates in order to optimize tracking. For example, at the lowest symbol rate the Doppler tracking specification is the most severe since the offset and rate are a significant portion of the symbol rate. At higher symbol rates the Doppler effects are negligible and better tracking performance is possible by tightening the loops.

Also, some allowance is made for using the loops to help acquire the signal by allowing a fairly wide dynamic range for the loop filter coefficients.

It is preferred that the duration of the delay of the preamble for sampling during the training interval is one-half the duration of the estimation interval 37 (FIG. 2) so that any error in the coarse estimate $f_{COARSE}$ of the carrier frequency of the received signal does not contribute to an absolute phase tracking error.

The absolute phase may be measured in the absence of a frequency error by correlation with the preamble portion over the period of a single correlation code sequence. It can be shown that the variance of the estimate in rad² is accurately estimated by:

$$\sigma_\theta^2 = \frac{1}{2 \cdot 10^{\gamma/10} \cdot N_{sym/Barker}} (\text{rad}^2) \quad [\text{Eq. 1}]$$

where: γ is the signal to noise ration in dB.

An average of $N_{Ave}$ separate correlation code correlations (assuming only a phase error) reduces the estimate by $N_{Ave}$, as is the case for Gaussian random variables, thus:

$$\sigma_\theta^2 = \frac{1}{2 \cdot 10^{\gamma/10} \cdot N_{sym/Barker} \cdot N_{Ave}} (\text{rad}^2) \quad [\text{Eq. 2}]$$

Figure 7:
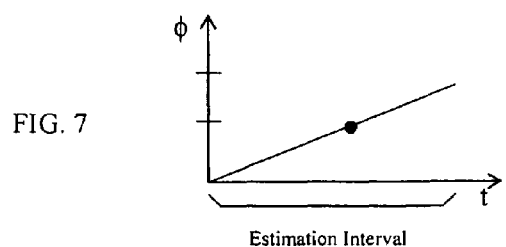
FIG. 7 is a graph showing the effect of a residual error in the coarse estimate of the carrier frequency upon the estimated phase parameter $\Phi_{EST}$ as a function of time t.

The minimum amount of time to make reliable phase and frequency estimates can be achieved if the phase and frequency estimations are performed on the same correlation code sequences near the beginning of the preamble rather than on disjoint segments of the preamble. In theory the estimates should be as good, provided that the estimation delay is accounted for. If there is a residual estimated frequency error during the phase estimation process, it is shown by FIG. 7 that for a fixed frequency error the estimated phase parameter $\Phi_{EST}$ should be the phase measured at the midpoint of the estimation interval. The total change due to Doppler rate (1 kHz/Sec) over one-half of the correlation code sequences will account for the following phase error (assuming a constant frequency error):

$$\phi_\varepsilon = 2\pi \cdot \int_0^{T_{OBSERV}} 1000 \cdot t\, dt \quad [\text{Eq. 3}]$$

FIG. 7 shows that in the presence of a residual frequency error resulting from the coarse estimate $f_{COARSE}$ of the carrier frequency, the estimated phase parameter $\Phi_{EST}$ will be equal to the true phase at the midpoint of the estimation interval. Thus, a delay of the preamble for sampling during the training interval by a duration equal to one-half the duration of the estimation interval prevents any error in the coarse estimate $f_{COARSE}$ of the carrier frequency from contributing to the absolute phase error.

In an exemplary embodiment, the observation period for a signal packet having 32 ksym/sec is 12×11/32k or 4.125 msec. Performing the integral over this observation period provides a computed phase error of $$\phi_\varepsilon = \frac{2\pi \cdot 1000 \cdot (4.125E - 3)^2}{2} = 5.35E - 2$$

Radians or about three degrees. This should present no problems for the phase-locked loop. Thus estimating both simultaneously should present no problems.

One can extend the results of the FIG. 7 phase estimate variance by using phase differences between correlated peaks to arrive at a variance for the frequency error:

$$\sigma_F^2 = \left(\frac{1}{2\pi\Delta t}\right)^2 \frac{1}{10^{\gamma/10} \cdot N_{Sym/Barker} \cdot N_{Ave(freq)}} (\text{Hz}^2) \quad [\text{Eq. 4}]$$

At 32 ksym/sec and 2 dB Es/No one can obtain for a frequency variance over twelve correlation code sequences that $\sigma_F^2$=1024 Hz, for a standard deviation of 32 Hz. This is an estimate that is on the order of 1 part in 1000 which is more than adequate.

The phase estimate would have a standard deviation under the same conditions of about 2.8 degrees.

It turns out that to measure higher order derivatives of the dynamics the problem becomes intractable quickly. For example the measurement of the Doppler rate variance is given by:

$$\sigma_F^2 = \quad [\text{Eq. 5}]$$
$$\left(\frac{1}{\sqrt{2} \cdot \pi \cdot \Delta t \cdot \Delta \tau}\right)^2 \cdot \frac{1}{10^{\gamma/10} \cdot N_{Sym/Barker} \cdot N_{Ave(freq\ rate)}} (\text{Hz}^2/\text{Sec}^2)$$

Δt is the amount of time between phase approximations and Δτ is the amount of time between frequency approximations.

The Δt·Δτ term is quite small over reasonable measurement intervals and as such the variance gets quite large. Over the preamble described herein the standard deviation is on the order of the quantity being measured. Thus this estimate is largely meaningless unless the observation time is very long or the SNR is very large, neither of which is the case.

The tracking system of FIG. 1 provides a simple single-pass flow-through pipeline that does not require either a least squares estimation of parameters to initialize a phase-lock loop, or recycling to generate the initialization values for the loop. Instead the phase-lock loop and the timing loop are trained by a potion of the preamble that is increased by using a multiplexer and the delay of the preamble to allow a second look at a longer portion of the preamble. This training allows the phase-lock loop and the timing loop to converge rapidly with a wide loop bandwidth and thereby improve the quality of the tracking. This training also allows a more rapid convergence of the loops and more robust demodulation of the packet even under cases of very high Doppler errors. Also the unique word UW can be decoded more reliably.

The present invention includes computer readable storage media containing instructions for accomplishing the various signal processing steps described herein. As used in the claims, the term computer readable storage medium is not limited to one computer readable medium, but may also be interpreted to mean a plurality of computer readable storage media.

The benefits specifically stated herein do not necessarily apply to every conceivable embodiment of the present invention. Further, such stated benefits of the present invention are only examples and should not be construed as the only benefits of the present invention.

While the above description contains many specificities, these specificities are not to be construed as limitations on the scope of the present invention, but rather as examples of the preferred embodiments described herein. Other variations are possible and the scope of the present invention should be determined not by the embodiments described herein but rather by the claims and their legal equivalents. The claims require no implicit limitations. Each claim is to be construed explicitly as stated, or by its legal equivalent.

Regarding the method claims, except for those steps that can only occur in the sequence in which they are recited, and except for those steps for which the occurrence of a given sequence is specifically recited or must be inferred, the steps of the method claims do not have to occur in the sequence in which they are recited.

The invention claimed is:

1. A method of tracking a received signal having a known preamble followed by a message portion, comprising the steps of:
   (a) tracking the received signal in accordance with tracking parameters to thereby provide a tracked signal;
   (b) providing estimated tracking parameters by processing said known preamble of the received signal during an estimation interval;
   (c) causing the received signal to be tracked in accordance with said estimated tracking parameters;
   (d) providing samples of said tracked signal by sampling said tracked signal;
   (e) delaying said preamble;
   (f) causing said samples to be provided during a training interval after said estimation interval by sampling the delayed preamble;
   (g) generating tracking error parameters during the training interval by processing said samples of the delayed preamble; and
   (h) causing said tracking of the received signal to be adjusted during the training interval in accordance with said tracking error parameters generated by step (g);
   wherein the duration of said delay is one-half the duration of said estimation interval so that any error in a coarse estimate of the carrier frequency of the received signal does not contribute to an absolute phase tracking error.

2. A method according to claim 1, wherein the duration of said estimation interval is approximately one-half the duration of said preamble.

3. A method of tracking a received signal having a known preamble followed by a message portion, comprising the steps of:
   (a) tracking the received signal in accordance with tracking parameters to thereby provide a tracked signal;
   (b) providing estimated tracking parameters by processing said known preamble of the received signal during an estimation interval;
   (c) causing the received signal to be tracked in accordance with said estimated tracking parameters;
   (d) providing samples of said tracked signal by sampling said tracked signal;
   (e) delaying said preamble;
   (f) causing said samples to be provided during a training interval after said estimation interval by sampling the delayed preamble;
   (g) generating tracking error parameters during the training interval by processing said samples of the delayed preamble;
   (h) causing said tracking of the received signal to be adjusted during the training interval in accordance with said tracking error parameters generated by step (g);
   (i) causing said samples to be provided after the training interval by sampling the message portion of the received signal;
   (j) generating tracking error parameters after the training interval by processing said samples of the message portion; and
   (k) causing said tracking of the received signal to be adjusted after the training interval in accordance with said tracking error parameters generated by step (j).

4. A system for tracking a received signal having a known preamble followed by a message portion, comprising:
   tracking means for tracking the received signal in accordance with tracking parameters to thereby provide a tracked signal;
   a first processor for providing estimated tracking parameters by processing said known preamble of the received signal during an estimation interval;
   means for causing the tracking means to track the received signal in accordance with said estimated tracking parameters;
   a sampler for providing samples of the tracked signal by sampling the tracked signal;
   means for delaying said preamble;
   means for causing the sampler to provide said samples during a training interval after said estimation interval by sampling the delayed preamble;
   a second processor for generating tracking error parameters during the training interval by processing said samples of the delayed preamble;
   means for causing the tracking means to adjust said tracking of the received signal during the training interval in accordance with said tracking error parameters generated by processing said samples of the delayed preamble;
   wherein the duration of said delay is one-half the duration of said estimation interval so that any error in a coarse estimate of the carrier frequency of the received signal does not contribute to an absolute phase tracking error.

5. A system according to claim 4, wherein the duration of said estimation interval is approximately one-half the duration of said preamble.

6. A system for tracking a received signal having a known preamble followed by a message portion, comprising:
   tracking means for tracking the received signal in accordance with tracking parameters to thereby provide a tracked signal;
   a first processor for providing estimated tracking parameters by processing said known preamble of the received signal during an estimation interval;
   means for causing the tracking means to track the received signal in accordance with said estimated tracking parameters;
   a sampler for providing samples of the tracked signal by sampling the tracked signal;
   means for delaying said preamble;

means for causing the sampler to provide said samples during a training interval after said estimation interval by sampling the delayed preamble;

a second processor for generating tracking error parameters during the training interval by processing said samples of the delayed preamble;

means for causing the tracking means to adjust said tracking of the received signal during the training interval in accordance with said tracking error parameters generated by processing said samples of the delayed preamble;

means for causing the sampler to provide said samples after the training interval by sampling the message portion of the received signal;

means for causing the second processor to generate tracking error parameters after the training interval by processing said samples of the message portion; and means for causing the tracking means to adjust said tracking of the received signal after the training interval in accordance with said tracking error parameters generated by processing said samples of the message portion.

7. A method of tracking the phase of a received signal packet having a known preamble followed by a message portion, comprising the steps of:

(a) generating a phase control signal in accordance with phase parameters;

(b) tracking the phase of the received signal packet by mixing the received signal packet with said phase control signal to thereby provide a phase-tracked signal packet;

(c) providing estimated phase and frequency parameters and estimated timing parameters by processing said known preamble during an estimation interval;

(d) causing said phase control signal to be generated in accordance with said estimated phase and frequency parameters;

(e) generating a timing control signal in accordance with timing parameters;

(f) providing samples of said phase-tracked signal packet by sampling said phase-tracked signal packet in accordance with said timing control signal;

(g) causing said timing control signal to be generated during said estimation interval in accordance with said estimated timing parameters;

(h) delaying said preamble;

(i) causing said samples to be provided during a training interval after said estimation interval by sampling the delayed preamble;

(j) generating phase error parameters and timing error parameters during the training interval by processing samples of the delayed preamble of the phase-tracked signal packet;

(k) causing the said phase control signal to be adjusted during the training interval in accordance with said phase error parameters generated by step (i); and (l) causing said timing control signal to be adjusted during the training interval in accordance with said timing error parameters generated by step (i);

wherein the duration of said delay is one-half the duration of said estimation interval so that any error in a coarse estimate of the carrier frequency of the received signal does not contribute to an absolute phase tracking error.

8. A method according to claim 7, wherein the duration of said estimation interval is approximately one-half the duration of said preamble.

9. A method of tracking the phase of a received signal packet having a known preamble followed by a message portion, comprising the steps of:

(a) generating a phase control signal in accordance with phase parameters;

(b) tracking the phase of the received signal packet by mixing the received signal packet with said phase control signal to thereby provide a phase-tracked signal packet;

(c) providing estimated phase and frequency parameters and estimated timing parameters by processing said known preamble during an estimation interval;

(d) causing said phase control signal to be generated in accordance with said estimated phase and frequency parameters;

(e) generating a timing control signal in accordance with timing parameters;

(f) providing samples of said phase-tracked signal packet by sampling said phase-tracked signal packet in accordance with said timing control signal;

(g) causing said timing control signal to be generated during said estimation interval in accordance with said estimated timing parameters;

(h) delaying said preamble;

(i) causing said samples to be provided during a training interval after said estimation interval by sampling the delayed preamble;

(j) generating phase error parameters and timing error parameters during the training interval by processing samples of the delayed preamble of the phase-tracked signal packet;

(k) causing the said phase control signal to be adjusted during the training interval in accordance with said phase error parameters generated by step (j); and (l) causing said timing control signal to be adjusted during the training interval in accordance with said timing error parameters generated by step (j);

(m) causing said samples to be provided after the training interval by sampling the message portion of the received signal packet;

(n) generating phase error parameters and timing error parameters after the training interval by processing said samples of the message portion;

(o) causing the said phase control signal to be adjusted after the training interval in accordance with said phase error parameters generated by step (n); and (p) causing said timing control signal to be adjusted after the training interval in accordance with said timing error parameters generated by step (n).

10. A system for tracking the phase of a received signal packet having a known preamble followed by a message portion, comprising:

a first oscillator for generating a phase control signal in accordance with phase parameters;

a mixer for tracking the phase of the received signal packet by mixing the received signal packet with said phase control signal to thereby provide a phase-tracked signal packet;

a first processor for providing estimated phase and frequency parameters and estimated timing parameters by processing said known preamble during an estimation interval;

means for causing the first oscillator to generate said phase control signal during said estimation interval in accordance with said estimated phase and frequency parameters;

a second oscillator for generating a timing control signal in accordance with timing parameters;

a sampler for providing samples of said phase-tracked signal packet by sampling said phase-tracked signal packet in accordance with said timing control signal;

means for causing the second oscillator to generate said timing control signal in accordance with said estimated timing parameters;

means for delaying said preamble;

means for causing the sampler to provide said samples during a training interval after said estimation interval by sampling the delayed preamble;

a second processor for generating phase error parameters and timing error parameters during the training interval by processing samples of the delayed preamble of the phase-tracked signal packet;

means for causing the first oscillator to adjust said phase control signal during the training interval in accordance with said phase error parameters generated by processing the delayed preamble; and means for causing the second oscillator to adjust said timing control signal during the training interval in accordance with said timing error parameters generated by processing the delayed preamble;

wherein the duration of said delay is one-half the duration of said estimation interval so that any error in a coarse estimate of the carrier frequency of the received signal does not contribute to an absolute phase tracking error.

11. A system according to claim 10, wherein the duration of said estimation interval is approximately one-half the duration of said preamble.

12. A system for tracking the phase of a received signal packet having a known preamble followed by a message portion, comprising:

a first oscillator for generating a phase control signal in accordance with phase parameters;

a mixer for tracking the phase of the received signal packet by mixing the received signal packet with said phase control signal to thereby provide a phase-tracked signal packet;

a first processor for providing estimated phase and frequency parameters and estimated timing parameters by processing said known preamble during an estimation interval;

means for causing the first oscillator to generate said phase control signal during said estimation interval in accordance with said estimated phase and frequency parameters;

a second oscillator for generating a timing control signal in accordance with timing parameters;

a sampler for providing samples of said phase-tracked signal packet by sampling said phase-tracked signal packet in accordance with said timing control signal;

means for causing the second oscillator to generate said timing control signal in accordance with said estimated timing parameters;

means for delaying said preamble;

means for causing the sampler to provide said samples during a training interval after said estimation interval by sampling the delayed preamble;

a second processor for generating phase error parameters and timing error parameters during the training interval by processing samples of the delayed preamble of the phase-tracked signal packet;

means for causing the first oscillator to adjust said phase control signal during the training interval in accordance with said phase error parameters generated by processing the delayed preamble;

means for causing the second oscillator to adjust said timing control signal during the training interval in accordance with said timing error parameters generated by processing the delayed preamble;

means for causing the sampler to provide said samples after the training interval by sampling the message portion of the received signal packet;

means for causing the second processor to generate said phase error parameters and said timing error parameters after the training interval by processing said samples of the message portion;

means for causing the first oscillator to adjust said phase control signal after the training interval in accordance with said phase error parameters generated by processing the message portion; and means for causing the second oscillator to adjust said timing control signal after the training interval in accordance with said timing error parameters generated by processing the message portion.

13. A computer readable medium for use with a computer in a system for tracking a received signal having a known preamble followed by a message portion, wherein the computer readable medium contains program instructions for:

(a) tracking the received signal in accordance with tracking parameters to thereby provide a tracked signal;

(b) providing estimated tracking parameters by processing said known preamble of the received signal during an estimation interval;

(c) causing the received signal to be tracked during said estimated interval in accordance with said estimated tracking parameters;

(d) providing samples of said tracked signal by sampling said tracked signal;

(e) delaying said preamble;

(f) causing said samples to be provided during a training interval after said estimation interval by sampling the delayed preamble;

(g) generating tracking error parameters during the training interval by processing said samples of the delayed preamble; and (h) causing said tracking of the received signal to be adjusted during said training interval in accordance with said tracking error parameters generated by step (g);

wherein the duration of said delay is one-half the duration of said estimation interval so that any error in a coarse estimate of the carrier frequency of the received signal does not contribute to an absolute phase tracking error.

14. A computer readable medium for use with a computer in a system for tracking a received signal having a known preamble followed by a message portion, wherein the computer readable medium contains program instructions for:

(a) tracking the received signal in accordance with tracking parameters to thereby provide a tracked signal;

(b) providing estimated tracking parameters by processing said known preamble of the received signal during an estimation interval;

(c) causing the received signal to be tracked during said estimated interval in accordance with said estimated tracking parameters;

(d) providing samples of said tracked signal by sampling said tracked signal;

(e) delaying said preamble;

(f) causing said samples to be provided during a training interval after said estimation interval by sampling the delayed preamble;

(g) generating tracking error parameters during the training interval by processing said samples of the delayed preamble; and (h) causing said tracking of the received signal to be adjusted during said training interval in accordance with said tracking error parameters generated by step (g);

(i) causing said samples to be provided after the training interval by sampling the message portion of the received signal;

(j) generating tracking error parameters after the training interval by processing said samples of the message portion; and (k) causing said tracking of the received signal to be adjusted after the training interval in accordance with said tracking error parameters generated by step (j).

15. A computer readable medium for use with a computer in a system for tracking the phase of a received signal packet having a known preamble followed by a message portion, wherein the computer readable medium contains program instructions for:

(a) generating a phase control signal in accordance with phase parameters;

(b) tracking the phase of the received signal packet by mixing the received signal packet with said phase control signal to thereby provide a phase-tracked signal packet;

(c) providing estimated phase and frequency parameters and estimated timing parameters by processing said known preamble during an estimation interval;

(d) causing said phase control signal to be generated in during said estimation interval in accordance with said estimated phase and frequency parameters;

(e) generating a timing control signal in accordance with timing parameters;

(f) providing samples of said phase-tracked signal packet by sampling said phase-tracked signal packet in accordance with said timing control signal;

(g) causing the timing control signal to be generated during said estimation interval in accordance with said estimated timing parameters;

(h) delaying said preamble;

(i) causing said samples to be provided during a training interval after said estimation interval by sampling the delayed preamble;

(j) generating phase error parameters and timing error parameters during the training interval by processing samples of the delayed preamble of the phase-tracked signal packet;

(k) causing the said phase control signal to be adjusted during the training interval in accordance with said phase error parameters generated by step (j); and (l) causing said timing control signal to be adjusted during the training interval in accordance with said timing error parameters generated by step (j);

whereby steps (b) and (f) are initialized during the estimation interval and trained during the training interval; and wherein the duration of said delay is one-half the duration of said estimation interval so that any error in a coarse estimate of the carrier frequency of the received signal does not contribute to an absolute phase tracking error.

16. A computer readable medium for use with a computer in a system for tracking the phase of a received signal packet having a known preamble followed by a message portion, wherein the computer readable medium contains program instructions for:

(a) generating a phase control signal in accordance with phase parameters;

(b) tracking the phase of the received signal packet by mixing the received signal packet with said phase control signal to thereby provide a phase-tracked signal packet;

(c) providing estimated phase and frequency parameters and estimated timing parameters by processing said known preamble during an estimation interval;

(d) causing said phase control signal to be generated during said estimation interval in accordance with said estimated phase and frequency parameters;

(e) generating a timing control signal in accordance with timing parameters;

(f) providing samples of said phase-tracked signal packet by sampling said phase-tracked signal in accordance with said timing control signal;

(g) causing said timing control signal to be generated during said estimation interval in accordance with said estimated timing parameters;

(h) delaying said preamble;

(i) causing said samples to be provided during a training interval after said estimation interval by sampling the delayed preamble;

(j) generating phase error parameters and timing error parameters during the training interval by processing samples of the delayed preamble of the phase-tracked signal packet;

(k) causing the said phase control signal to be adjusted during the training interval in accordance with said phase error parameters generated by step (j);

(l) causing said timing control signal to be adjusted during the training interval in accordance with said timing error parameters generated by step (j);

whereby steps (b) and (f) are initialized during the estimation interval and trained during the training interval;

(m) causing said samples to be provided after the training interval by sampling the message portion of the received signal packet;

(n) generating phase error parameters and timing error parameters after the training interval by processing said samples of the message portion;

(o) causing the said phase control signal to be adjusted after the training interval in accordance with said phase error parameters generated by step (n); and (p) causing said timing control signal to be adjusted after the training interval in accordance with said timing error parameters generated by step (n).

* * * * *

UNITED STATES PATENT AND TRADEMARK OFFICE
CERTIFICATE OF CORRECTION

PATENT NO. : 7,606,342 B1  Page 1 of 1
APPLICATION NO. : 11/398088
DATED : October 20, 2009
INVENTOR(S) : John Robert Wiss et al.

It is certified that error appears in the above-identified patent and that said Letters Patent is hereby corrected as shown below:

Column 17, line 57, "(i)" should be "(j)"

Column 17, line 60, "(i)" should be "(j)"

Column 21, line 33, "in" should be omitted.

Signed and Sealed this

Twenty-third Day of February, 2010

David J. Kappos
*Director of the United States Patent and Trademark Office*

UNITED STATES PATENT AND TRADEMARK OFFICE
CERTIFICATE OF CORRECTION

PATENT NO.       : 7,606,342 B1
APPLICATION NO.  : 11/398088
DATED            : October 20, 2009
INVENTOR(S)      : Wiss et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 827 days.

Signed and Sealed this

Twelfth Day of October, 2010

David J. Kappos
*Director of the United States Patent and Trademark Office*